(12) United States Patent
Criado del Pino et al.

(10) Patent No.: US 10,927,871 B2
(45) Date of Patent: Feb. 23, 2021

(54) AFFIXING DEVICE FOR PIECES

(71) Applicant: ILLINOIS TOOL WORKS INC., Glenview, IL (US)

(72) Inventors: Francisco Criado del Pino, Barcelona (ES); Jorge Gustavo Barcelo, Barcelona (ES); Javier Arteta Unanua, Barcelona (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 157 days.

(21) Appl. No.: 16/153,169

(22) Filed: Oct. 5, 2018

(65) Prior Publication Data

US 2019/0107135 A1 Apr. 11, 2019

(30) Foreign Application Priority Data

Oct. 10, 2017 (ES) .............................. ES201731193

(51) Int. Cl.
| | | |
|---|---|---|
| *F16B 5/02* | (2006.01) | |
| *F16B 13/12* | (2006.01) | |
| *F16B 13/04* | (2006.01) | |
| *F16B 37/04* | (2006.01) | |
| *F16B 5/06* | (2006.01) | |
| *F16B 13/10* | (2006.01) | |
| *B60R 19/18* | (2006.01) | |

(52) U.S. Cl.
CPC .............. *F16B 13/04* (2013.01); *F16B 5/025* (2013.01); *F16B 5/065* (2013.01); *F16B 13/124* (2013.01); *F16B 37/041* (2013.01); *B60R 19/18* (2013.01); *B60R 2019/1886* (2013.01); *F16B 37/042* (2013.01); *F16B 2013/10* (2013.01)

(58) Field of Classification Search
CPC ...... F16B 13/04; F16B 13/121; F16B 13/124; F16B 13/126; F16B 13/128; F16B 5/025; F16B 5/065; F16B 37/042; F16B 21/02
USPC .................................................. 411/182, 172
See application file for complete search history.

(56) References Cited

U.S. PATENT DOCUMENTS 4,208,944 A * 6/1980 Moryl ................... F16B 37/043
411/182
4,911,593 A * 3/1990 Kephart .............. F16B 23/0038
411/403

(Continued)

FOREIGN PATENT DOCUMENTS

DE 102009030040 12/2010
EP 0414162 2/1991

(Continued)

*Primary Examiner* — Victor D Batson
*Assistant Examiner* — Amit Singh Dhillon
(74) *Attorney, Agent, or Firm* — Thompson Hine LLP

(57) ABSTRACT

The affixing device for pieces includes an affixing element (1) that can be positioned through an opening (6) in each one of the pieces (7, 8) that are affixed to each other, that also comprises a first and second retaining elements (2, 3), which, when they are in their affixing positions, are in contact with the pieces (7, 8) that are affixed to each other, with the affixing element (1) passing through the first and second retaining elements (2, 3), and with the first retaining element (2) including an accommodation space for a tool. This configuration allows for faster and simpler assembly of the affixing device, also avoiding problems of misalignment.

11 Claims, 3 Drawing Sheets

(56) References Cited

U.S. PATENT DOCUMENTS

| | | | | |
|---|---|---|---|---|
| 5,106,225 A | * | 4/1992 | Andre | F16B 5/0233 |
| | | | | 403/297 |
| 5,888,012 A | * | 3/1999 | Nygren, Jr. | F16B 5/0225 |
| | | | | 403/13 |
| 6,074,146 A | * | 6/2000 | Soemer | F16B 5/0208 |
| | | | | 411/107 |
| 6,149,653 A | * | 11/2000 | Deslauriers | A61B 17/0401 |
| | | | | 606/232 |
| 6,560,819 B2 | * | 5/2003 | Mizuno | B60R 16/0222 |
| | | | | 16/2.1 |
| 6,620,167 B2 | * | 9/2003 | Deslauriers | A61B 17/861 |
| | | | | 411/407 |
| 8,424,173 B2 | * | 4/2013 | Shiba | F16B 5/065 |
| | | | | 24/297 |
| 9,452,007 B1 | * | 9/2016 | McGuire | A61B 17/8645 |
| 2003/0047946 A1 | | 3/2003 | Ohancsian | |
| 2006/0042053 A1 | | 3/2006 | Kawai | |
| 2008/0193251 A1 | * | 8/2008 | Sbongk | F16B 37/044 |
| | | | | 411/104 |
| 2011/0091301 A1 | * | 4/2011 | Shimizu | F16B 37/043 |
| | | | | 411/511 |
| 2012/0131772 A1 | | 5/2012 | Hofmann | |
| 2016/0199967 A1 | * | 7/2016 | Stahl | B25B 23/12 |
| | | | | 81/460 |
| 2016/0215810 A1 | * | 7/2016 | Echito | F16B 25/103 |
| 2017/0130750 A1 | | 5/2017 | Holzinger | |

FOREIGN PATENT DOCUMENTS

| | | | | |
|---|---|---|---|---|
| ES | 2415956 A2 | * | 7/2013 | F16B 37/043 |
| WO | WO-2009109268 A1 | * | 9/2009 | F16B 37/005 |
| WO | WO 2013112513 | | 8/2013 | |
| WO | WO 2014/146187 | | 9/2014 | |

* cited by examiner

AFFIXING DEVICE FOR PIECES

TECHNICAL FIELD

The present invention relates to an affixing device for pieces, in particular, for the affixing of vehicle pieces, for example, to secure a bumper to a structure of the vehicle.

BACKGROUND

During the manufacture of a vehicle, many pieces must be assembled, using different affixing devices to affix different pieces together. To do this, the two pieces to be affixed normally comprise two openings, into which the affixing device is inserted and then tightened to secure the elements.

Normally, the positioning of the affixing device in is position of use is done manually, and a tool, a screwdriver for example, is then inserted to perform the tightening.

Obviously, this essentially manual assembly is prone to errors and imprecision, specifically in regard to the possibility of inserting the affixing device out of alignment in relation to the reference surface.

In addition, this type of assembly is laborious, because it requires two actions: manual positioning and tightening.

The aforementioned drawbacks can be especially delicate in the case of the assembly of some pieces, for example, the assembly of a bumper to a structure of a vehicle, because this requires a very robust, fast and secure assembly.

Therefore, one objective of the present invention is to provide an affixing device for pieces that is easily and quickly positioned and that avoids the problems of misalignment.

SUMMARY

The affixing device of the invention resolves the aforementioned drawbacks, presenting other advantages that are described below.

In one aspect, an affixing device, for affixing first and second pieces to each other, comprises an affixing element that can be positioned through a respective opening in each one of the first and second pieces that are affixed to each other, wherein the affixing device also comprises a first retaining element having an affixing position and a second retaining element having an affixing position, wherein, in the affixing position of the first retaining element, the first retaining element is in contact with the first piece and, in the affixing position of the second retaining element, the second retaining element is in contact with the second piece, with the affixing element passing through said first and second retaining elements, and with the first retaining element comprising an accommodation space for a tool.

In another aspect, an affixing device, for affixing first and second pieces to each other, comprises a threaded affixing element passing through and threadedly engaged with each of a first retaining element and a second retaining element, the affixing device configured to be positioned through a respective opening in each one of the first and second pieces that are affixed to each other and such that a portion of the first retaining element engages the first piece and a portion of the second retaining element engages the second piece in order to hold the first piece and the second piece together, wherein the first retaining element comprises an accommodation space for a tool and an engageable head of the affixing element is located within the accommodation space.

The affixing device for pieces, according to one aspect, comprises an affixing element that can be positioned through an opening in each one of the pieces that are affixed to each other, and is characterized in that it also comprises a first and second retaining elements, which, when they are in their affixing position, are in contact with the pieces, that are affixed to each other, with the affixing element passing through said first and second retaining elements, and with the first retaining element comprising an accommodation space for a tool.

This allows for faster and simpler assembly of the affixing device, also avoiding problems of misalignment, because the accommodation space of the first retaining element allows the positioning of a tool, for example, a screwdriver, to perform the assembly and then remove the tool.

According to a preferred embodiment, said accommodation space of the first retaining element is defined by at least one perimeter wall, or by a plurality of perimeter walls, with each wall preferably having a curved footprint.

To facilitate the coupling between the first retaining element and a tool, the at least one perimeter wall or each one of the plurality of perimeter walls comprises a distal lip.

Advantageously, said first retaining element comprises a circular base, which, in its assembly position, is in contact with one of the pieces that are affixed to each other, and preferably, said at least one wall extends substantially perpendicular with respect to said circular base.

According to a preferred embodiment, said second retaining element comprises a plurality of feet.

In addition, the affixing device according to the present invention may also comprises a seal positioned between the first and second retaining elements.

BRIEF DESCRIPTION OF THE DRAWINGS

To provide a better understanding of the description, a series of drawings are included that schematically, and solely as an example and not for the purposes of limitation, represent a practical embodiment of the invention.

FIG. 1 shows the moment of the positioning of the device, FIG. 2 shows the moment of the tightening, and FIG. 3 shows the moment of the removal of the tool.

DETAILED DESCRIPTION

Figure 1:
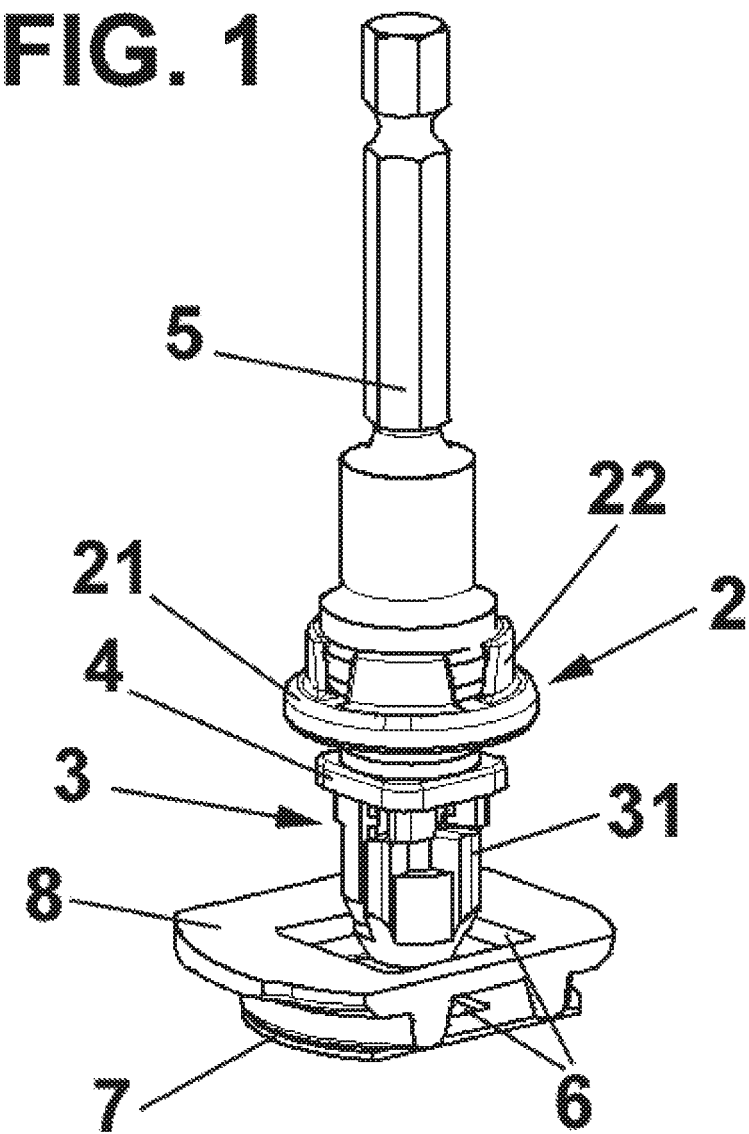
FIGS. 1 to 3 are perspective views of the affixing device according to the present invention during its assembly process; in particular.

As shown in the figures, the affixing device according to the present invention comprises the following components: an affixing element 1, a first retaining element 2 and a second retaining element 3.

The affixing element 1 may be a conventional threaded element, for example, a screw, bolt, or similar element, which preferably comprises a head 11 equipped with a complementary opening with a tool 5, that allows the tightening of said affixing element 1. Each retaining element 2, 3 may include a threaded through opening, with the affixing element passing through and threadedly engaging each of the through openings such that relative rotation between the affixing element and the retaining elements will cause movement of the retaining elements toward each other.

Said tool 5 is shaped such that it allows its insertion into the first retaining element 2 before it is positioned in the openings 6. In addition, once the pieces 7, 8 have been firmly joined by means of rotation of the affixing element 1, the tool 5 allows its release from the first retaining element 2 with a small external force.

This affixing element 1 passes through the two openings 6 of the pieces 7, 8 that are to be joined together. For example, the pieces may be a structure 7 and a bumper 8, or any other similar pieces.

The first retaining element 2, in its assembly position (FIGS. 2 and 3) is in contact with said pieces 8, and comprises an accommodation space for the positioning of the tool 5, for example, a screwdriver, to facilitate the tightening of the affixing element 1.

According to the embodiment shown, the first retaining element comprises circular base 21, from which a plurality of perimeter walls 22, which advantageously have a curved footprint, extend in a substantially perpendicular manner.

Figure 2:
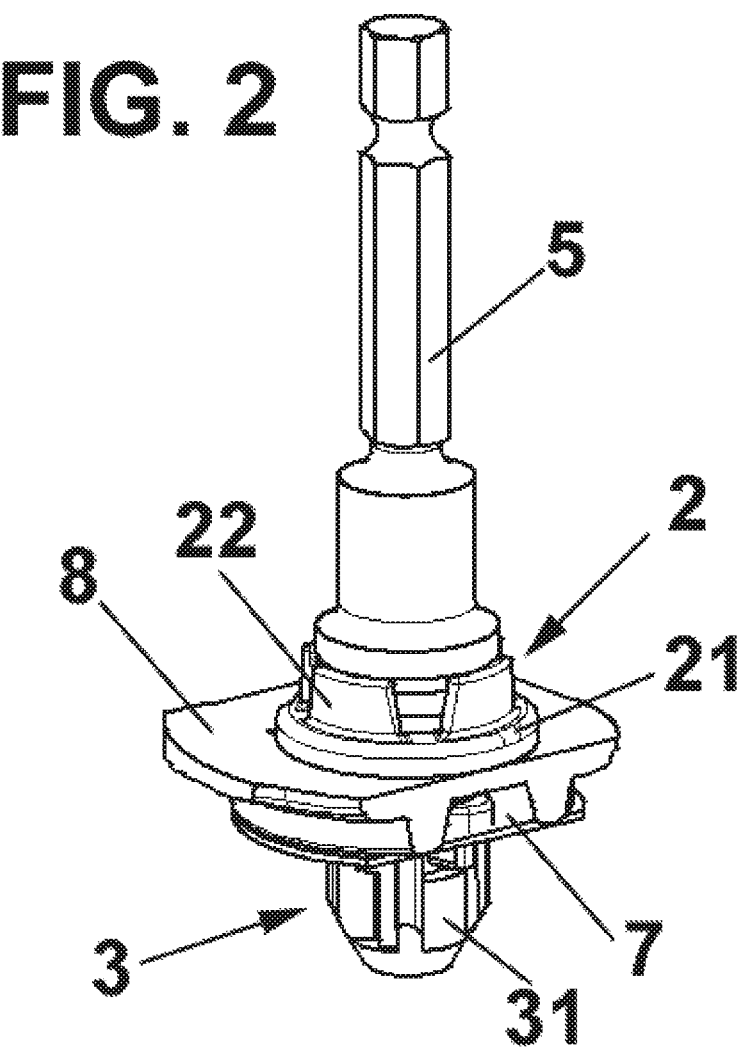

To facilitate the retention of the tool, each one of said perimeter walls 22 comprises a distal lip 23, which preferably couples in the interior of a slot 51 of the tool 5, as shown in FIG. 2.

It should be noted, however, that the accommodation space of the first retaining element 2 may be defined by only one perimeter wall 22, although in this case, the material of said perimeter wall 22 must be sufficiently elastic to allow the accommodation space and removal of the tool 5. Occasionally, the slot 51 may be placed in the piece 2 and the lip 23 in the tool 5.

Figure 3:
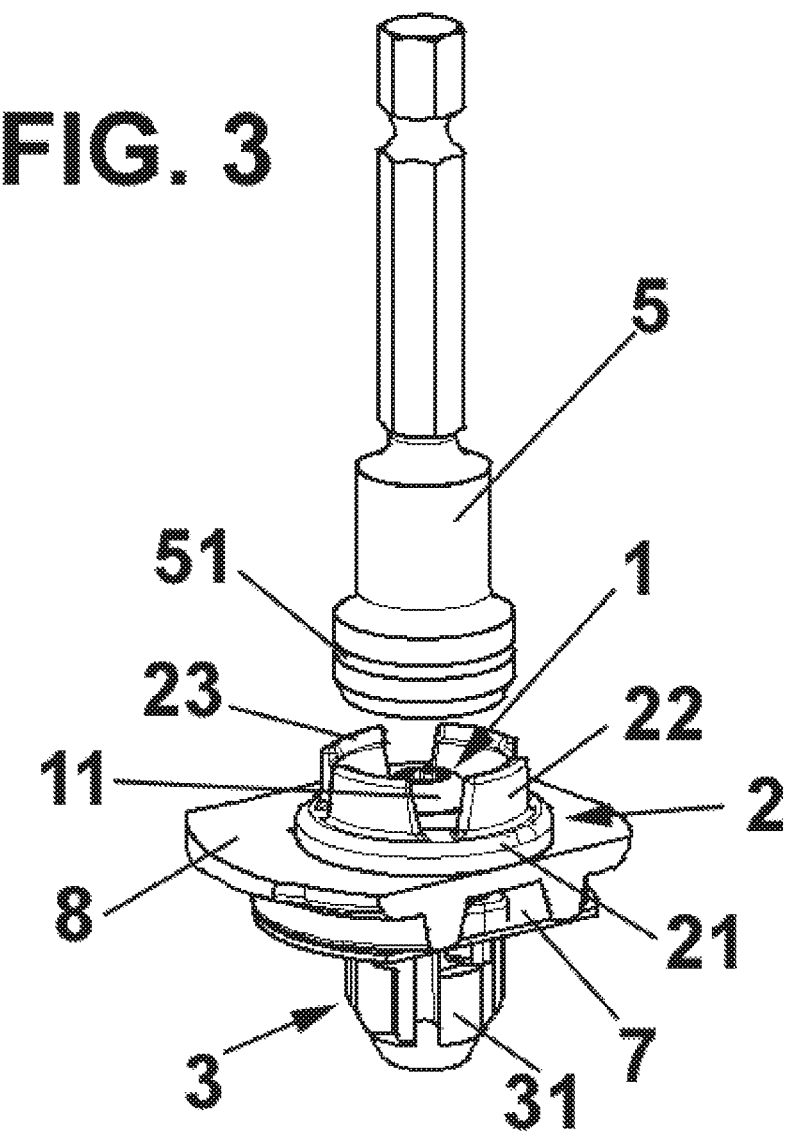

The second retaining element 3, in its assembly position shown in FIGS. 2 and 3, is in contact with the other piece 7, and according to the embodiment shown, comprises a plurality of feet 31.

The affixing device according to the present invention also advantageously comprises a seal 4, which in its assembly position is positioned between the first 2 and second 3 retaining elements.

The affixing device according to the present invention functions as follow:

First, with the affixing element threadedly engaged with each of the retaining elements 2 and 3, and with the tool 5 positioned in the accommodation space of the first retaining element 2 and coupled with the affixing element 1 through its head 11, the affixing device is placed in its position of use, by passing the affixing device through the openings 6 of the pieces 7, 8, for example a structure of a vehicle and a bumper (FIG. 1). When the affixing device is moved into the openings 6 of the pieces 7, 8, the base 21 of retaining element 2 will engage the upper surface of piece 8 to limit further passage of the affixing device.

To facilitate the positioning, the tool 5 is held in inside the accommodation space thanks to the presence of the lip 23 on the perimeter walls 22 of the first retaining element 2, which fit into a slot 51 of said tool 5.

When the affixing device is positioned in this manner, its alignment with respect to the pieces 7, 8 is guaranteed. To do this, it is also possible for the feet 31 of the second retaining element 3 to form a polygon, whose shape coincides with the shape of the openings 6, so that only the feet 31 will be inserted into said openings 6 if the insertion is carried out in a substantially perpendicular manner.

Once the affixing device has been put into position (FIG. 2), the affixing element 1 will be tightened, such that the first and second retaining elements 2, 3 come into contact with both pieces 7, 8, with a sufficient degree of tightness to guarantee correct affixing. That is, when the affixing element 1 is rotated the retaining elements 2, 3 are pulled together, toward each other, so that some part of retaining element 3 (e.g., feet 31) will engage with a lower surface of the piece 7, while wall 21 engages the upper surface of piece 8, to hold the pieces 7 and 8 tightly together. This tightening is done by turning the affixing element 1 in the proper direction. This turning will cause the displacement of the affixing element inside both retaining elements 2, 3. Upon conclusion of the tightening, the seal 4 will be in its sealing position, which is between the lower surface of piece 8 and the upper surface of piece 7 and engaged with both such surfaces.

Once the tightening has been carried out, the tool 5 is removed, with this able to be done easily thanks to the elastic nature of the perimeter walls 22 that form the accommodation space of the first retaining element 2.

Although reference has been made to a specific embodiment of the invention, it is clear for a person skilled in the art that numerous variations and modifications may be made to the affixing device described, and that all of the details mentioned may be substituted with other technically equivalent details, without falling outside the scope of protection defined by the attached claims.

The invention claimed is:

1. An affixing device for affixing first and second pieces to each other, the affixing device comprising an affixing element that can be positioned through a respective opening in each one of the first and second pieces that are affixed to each other, wherein the affixing device also comprises a first retaining element having an affixing position and a second retaining element having an affixing position, wherein, in the affixing position of the first retaining element, the first retaining element is in contact with the first piece and, in the affixing position of the second retaining element, the second retaining element is in contact with the second piece, with the affixing element passing through said first and second retaining elements, and with the first retaining element comprising an accommodation space for a tool;
   wherein said accommodation space of the first retaining element is defined by at least one perimeter wall;
   wherein the at least one perimeter wall comprises a distal lip configured to facilitate retention of the tool in the accommodation space; and
   wherein a head of the affixing element is configured to engage the tool and is located within the accommodation space.

2. The affixing device for pieces according to claim 1, in which said accommodation space of the first retaining element comprises a circular base.

3. The affixing device for pieces according to claim 2, in which said at least one perimeter wall extends substantially perpendicular with respect to the circular base.

4. The affixing device for pieces according to claim 1, in which the affixing device also comprises a seal positioned between the first and second retaining elements.

5. The affixing device for pieces according to claim 1, in which the accommodation space of the first retaining element is defined by a plurality of said perimeter walls, with each wall having a curved footprint.

6. An affixing device for affixing first and second pieces to each other, the affixing device comprising a threaded affixing element passing through and threadedly engaged with each of a first retaining element and a second retaining element, the affixing device configured to be positioned through a respective opening in each one of the first and second pieces that are affixed to each other and such that a portion of the first retaining element engages the first piece and a portion of the second retaining element engages the second piece in order to hold the first piece and the second piece together, wherein the first retaining element comprises an accommodation space for a tool and a head of the affixing element is configured to engage the tool and is located within the accommodation space, wherein said accommodation space of the first retaining element is defined by at least one perimeter wall, and wherein the at least one perimeter wall comprises a distal lip configured to facilitate retention of the tool in the accommodation space.

7. The affixing device according to claim 6, wherein said accommodation space of the first retaining element comprises a circular base that engages the first piece.

8. The affixing device according to claim 7, wherein said at least one perimeter wall extends substantially perpendicularly to and away from the circular base to define an open end of the accommodation space.

9. The affixing device according to claim 6, wherein the affixing device also comprises a seal positioned between the first and second retaining elements.

10. The affixing device for pieces according to claim 1, wherein said at least one perimeter wall is elastic to allow the insertion and removal of the tool in the accommodation space past the distal lip.

11. The affixing device according to claim 6, wherein said at least one perimeter wall is elastic to allow the insertion and removal of the tool in the accommodation space past the distal lip.

\* \* \* \* \*